Jan. 29, 1946. K. C. BUGG ET AL 2,393,587
TEMPORARY FASTENER
Filed Nov. 1, 1943
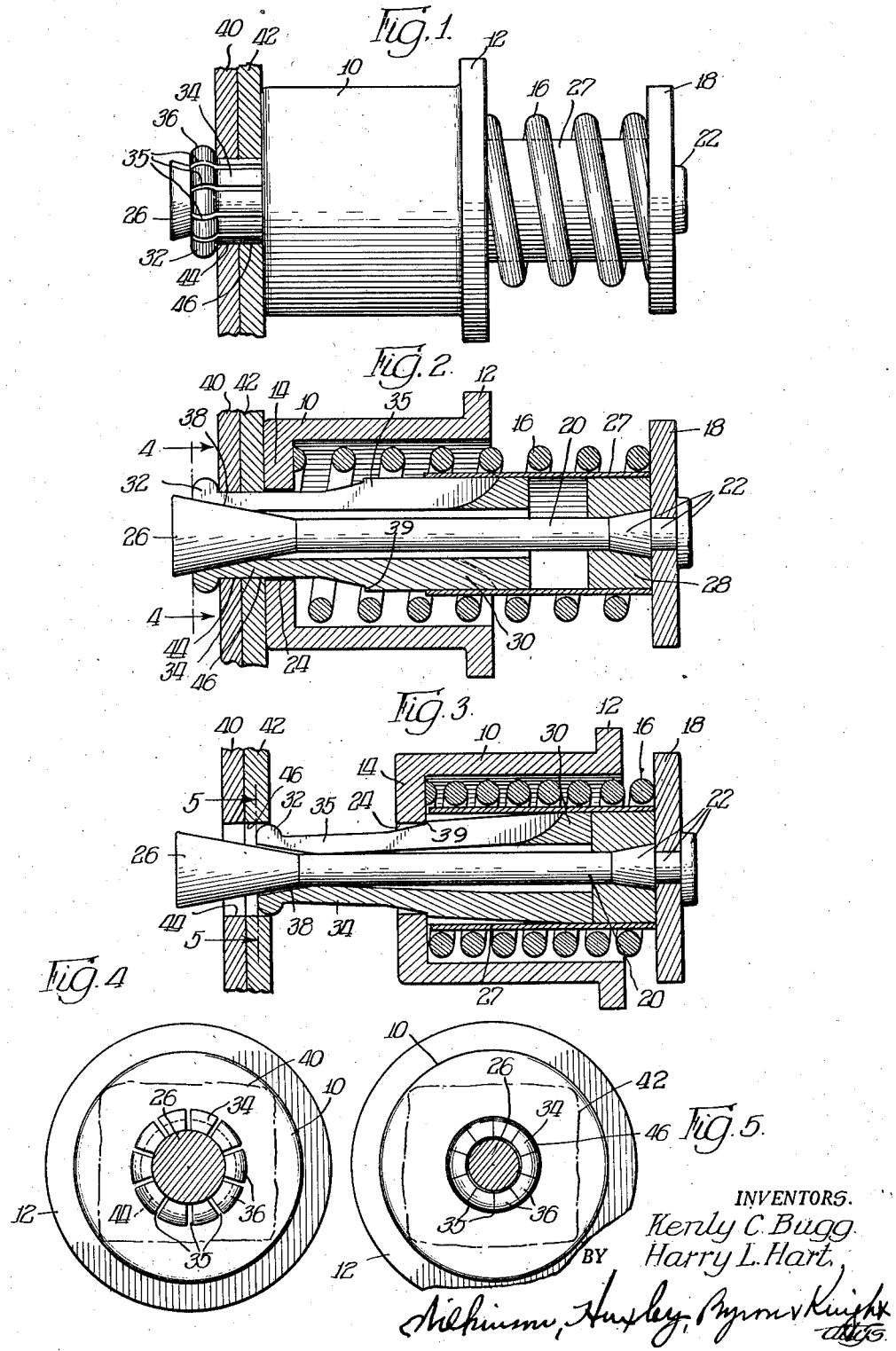
INVENTORS.
Kenly C. Bugg
Harry L. Hart,
BY Patented Jan. 29, 1946

2,393,587

UNITED STATES PATENT OFFICE 2,393,587

TEMPORARY FASTENER

Kenly C. Bugg and Harry L. Hart, Fort Wayne, Ind.; said Hart assignor to said Bugg Application November 1, 1943, Serial No. 508,504

8 Claims. (Cl. 85—5)

This invention pertains to temporary fasteners.

It is an object of this invention to provide a temporary fastener, which is adapted to dowel and fill the holes of adjacent members to be secured together for subsequent operations.

Another object of the invention is to provide a temporary fastener adapted to tightly hold together members to be subsequently secured together or otherwise operated upon, the temporary fastener being adapted to be operable even though the adjacent holes through which the fastener extends are over-size or not truly round.

Another object of the invention is to provide a temporary fastener adapted to dowel and fill the holes of adjacent members to be operated upon, and to so tightly hold said members in relative fixed positions that there can be no relative movement between the members.

With these and various other objects in view, the invention may consist of certain novel features of construction and operation as will be more fully described and particularly pointed out in the specification, drawing and claims appended hereto.

In the drawing, which illustrates embodiments of the device and wherein like reference characters are used to designate like parts:

Figure 1 is an enlarged elevation of a temporary fastener, embodying the invention showing the same in position fastening two members (plates) together.

Figure 2 is an enlarged sectional elevation of the temporary fastener illustrated in Figure 1;

Figure 3 is an enlarged sectional elevation, corresponding to Figure 2, showing the temporary fastener in inoperative condition, wherein it may be readily insertable through the adjacent holes of articles to be secured together shown as two plates;

Figure 4 is a transverse sectional elevation taken substantially in the plane as indicated by line 4—4 of Figure 2; and Figure 5 is an enlarged sectional elevation taken substantially in the plane as indicated in the line 5—5 of Figure 3.

The fastener illustrated comprises the locking body member 10 provided at its open end with the flange 12, whereby the fastener may be readily held for application. The body member 10 is shown as cylindrical or cup shaped and is closed by the bottom or work engaging wall 14, provided at the opposite end of the body member from the flange 12. The compression spring 16 extends into the body member being seated at one end on the bottom wall 14 and seated at its other end on the head 18 of the locking plunger 20. The locking plunger 20 is secured to said head 18, as at 22, and extends through the aperture 24 provided in the bottom wall 14 of the locking member.

The end of the locking plunger is provided with the locking cam 26 which, in the form shown, is substantially frusto-conical, the larger base being at the end remote from the plunger 20. The head 18 is provided with the plunger sleeve 27, which extends toward the wall 14, and the spacing block 28 is provided in said sleeve and carrying said sleeve, said block being adapted in inoperative position (Figure 3) to engage and project the segmental locking and expanding sleeve 30 outwardly to the body member 10. The block 28 may be tightly secured to the plunger 20 adjacent the fastening 22, and also the sleeve 27 may be welded to the head 18. This sleeve 30 is slidably and guidably mounted in sleeve 27.

The segmental locking and expanding sleeve is formed with the end flange or ridge 32 and the shank 34, which, in its initial position prior to forming, is cylindrical and substantially of the diameter of the holes of the members to be secured together. The sleeve 30 is then slotted as at 35, forming fingers 36, which fingers are then collapsed (Figure 5) and the sleeve is tempered to impart resilience to the fingers 36, whereby the fingers always tend to assume their inoperative position, as shown in Figures 3 and 5. The inside of the fingers is provided with the cam surfaces 38 of the same slope as that of the cone of the locking cam 26, and said fingers are provided with shoulders 39 engageable with the wall 14 to prevent the fingers from extending beyond the body member 10 except to a predetermined extent.

In fastening together the two members 40 and 42 by means of the temporary fastener, it is, of course, understood that the members (plates) are provided with the aligned apertures 44 and 46. The head 18 is moved toward the left as viewed in Figure 1 to the position illustrated in Figure 3, causing the fingers 36 to be projected, but the cone 26 will be projected outwardly beyond the end of the fingers, permitting them to assume their contracted position such as illustrated in Figures 3 and 5. The fastener is then inserted through the holes and the head 18 is released. The head 18 will be moved toward the right by the spring 16, causing the cone 26 to spread the fingers 36 to a position where the flanges 32 overlie the adjacent sheet 40. Inasmuch as the flange 32 engages the sheet 40, the spring 16 will urge the wall 14 of the body member into tight engagement with the adjacent sheet 42. Thus the apertures 44 and 46 are doweled and substantially completely filled (as in the expanded position the fingers engage the wall of the holes over their entire surfaces, as the fingers are made from stock originally substantially hole size and then collapsed) and the fingers tend to have a key effect into the adjacent sheets enhancing the tight holding of the fastener.

It is to be understood that we do not wish to be limited by the exact embodiments of the device shown, which are merely by way of illustration and not limitation as various and other forms of the device will, of course, be apparent to those skilled in the art without departing from the spirit of the invention or the scope of the claims.

We claim:

1. In a fastener, the combination of a body member, having an apertured end wall at one end and an outwardly extending flange at the other end, a locking sleeve having fingers extending through the aperture of the end wall, said fingers each having a locking ridge on the outer ends thereof and tending to move to collapsed position, a plunger disposed inwardly of said fingers and having a cam end so arranged that movement of said cam end toward the fingers opens said fingers, means carried by the plunger movable as the cam end is moved away from the fingers to cause the fingers to move outwardly of the body member, and resilient means urging said cam end toward said fingers.

2. In a fastener, the combination of a body member, a locking sleeve retained in said body member, said sleeve comprising fingers extending beyond said sleeve, said fingers each having a locking ridge on the outer ends thereof and tending to move to collapsed position, a plunger disposed inwardly of said fingers and having a cam end so arranged that movement of said cam end toward the fingers opens said fingers, means carried by the plunger movable as the cam end is moved away from the fingers to cause the fingers to move outwardly of the body member, and resilient means urging said cam end toward said fingers.

3. In a fastener, the combination of a body member, having an apertured end wall at one end and an outwardly extending flange at the other end, a locking sleeve having fingers extending through the aperture of the end wall, the outer surface of said fingers in locking position being substantially circular in section, said fingers each having a locking ridge on the outer ends thereof and tending to move to collapsed position, a plunger disposed inwardly of said fingers and having a cam end so arranged that movement of said cam end toward the fingers opens said fingers, means carried by the plunger movable as the cam end is moved away from the fingers to cause the fingers to move outwardly of the body member, and resilient means urging said cam end toward said fingers.

4. In a fastener, the combination of a body member, a locking sleeve retained in said body member, said sleeve comprising fingers extending beyond said sleeve, the outer surface of said fingers in locking position being substantially circular in section, said fingers each having a locking ridge on the outer ends thereof and tending to move to collapsed position, a plunger disposed inwardly of said fingers and having a cam end so arranged that movement of said cam end toward the fingers opens said fingers, means carried by the plunger movable as the cam end is moved away from the fingers to cause the fingers to move outwardly of the body member, and resilient means urging said cam end toward said fingers.

5. In a fastener, the combination of a body member having an apertured end wall at one end and an outwardly extending flange at the other end, a locking sleeve having fingers extending through the aperture of the end wall, the outer surface of said fingers in locking position being substantially circular in section, said fingers each having locking ridge on the outer ends thereof and tending to move to collapsed position, a plunger disposed inwardly of said fingers and having a cam end so arranged that movement of said cam end toward the fingers opens said fingers, a head for moving said plunger, a plunger sleeve carried by said head and slidably retaining said locking sleeve, a spacing member in said plunger sleeve adapted to move said fingers outwardly of the body member in collapsed position, and resilient means interposed between said head and apertured end wall tending to move said head away from said body member to cause the cam end to expand said fingers to locking position.

6. In a fastener, the combination of a body member having an apertured end wall at one end and an outwardly extending flange at the other end, a locking sleeve having fingers extending through the aperture of the end wall, said fingers each having a locking ridge on the outer ends thereof and tending to move to collapsed position, a plunger disposed inwardly of said fingers and having a cam end so arranged that movement of said cam end toward the fingers opens said fingers, a head for moving said plunger, a plunger sleeve carried by said head and slidably retaining said locking sleeve, a spacing member in said plunger sleeve adapted to move said fingers outwardly of the body member in collapsed position, and resilient means interposed between said head and apertured end wall tending to move said head away from said body member to cause the cam end to expand said fingers to locking position.

7. In a fastener, the combination of a body member having an apertured end wall at one end and an outwardly extending flange at the other end, locking fingers extending through the aperture of the end wall the outer surface of said fingers in locking position being substantially circular in section, said fingers each having a locking ridge on the outer ends thereof and tending to move to collapsed position, a plunger disposed inwardly of said fingers and having a cam end so arranged that movement of said cam end toward the fingers opens said fingers, a head for moving said plunger, a plunger sleeve carried by said head and slidably retaining said locking sleeve, a spacing member in said plunger sleeve adapted to move said fingers outwardly of the body member in collapsed position, and resilient means interposed between said head and apertured end wall tending to move said head away from said body member to cause the cam end to expand said fingers to locking position.

8. In a fastener, the combination of a body member having an apertured end wall at one end and an outwardly extending flange at the other end, locking fingers extending through the aperture of the end wall, said fingers each having a locking ridge on the outer ends thereof and tending to move to collapsed position, a plunger disposed inwardly of said fingers and having a cam end so arranged that movement of said cam end toward the fingers opens said fingers, a head for moving said plunger, a plunger sleeve carried by said head and slidably retaining said locking sleeve, a spacing member in said plunger sleeve adapted to move said fingers outwardly of the body member in collapsed position, and resilient means interposed between said head and apertured end wall tending to move said head away from said body member to cause the cam end to expand said fingers to locking position.

KENLY C. BUGG.
HARRY L. HART.